US012806955B2

(12) United States Patent
Ruiz Diez et al.

(10) Patent No.: US 12,806,955 B2
(45) Date of Patent: Nov. 24, 2026

(54) VEHICLE ROLL CONTROL

(71) Applicant: JAGUAR LAND ROVER LIMITED, Whitley (GB)

(72) Inventors: David Ruiz Diez, Whitley (GB); James Robertson, Whitley (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 21 days.

(21) Appl. No.: 18/862,903

(22) PCT Filed: May 2, 2023

(86) PCT No.: PCT/EP2023/061549
§ 371 (c)(1),
(2) Date: Nov. 4, 2024

(87) PCT Pub. No.: WO2023/213810
PCT Pub. Date: Nov. 9, 2023

(65) Prior Publication Data

US 2025/0313054 A1 Oct. 9, 2025

(30) Foreign Application Priority Data

May 5, 2022 (GB) ...................................... 2206585

(51) Int. Cl.
*B60G 17/052* (2006.01)

(52) U.S. Cl.
CPC ...... *B60G 17/052* (2013.01); *B60G 2202/152* (2013.01); *B60G 2400/104* (2013.01); *B60G 2500/201* (2013.01); *B60G 2800/012* (2013.01)

(58) Field of Classification Search
CPC ............ B60G 17/052; B60G 2202/152; B60G 2400/104; B60G 2500/201;
(Continued)

(56) References Cited

U.S. PATENT DOCUMENTS

| | | | | |
|---|---|---|---|---|
| 6,217,047 B1 * | 4/2001 | Heyring | ............... | B60G 21/073 280/124.106 |
| 10,703,160 B2 * | 7/2020 | Koumura | ........... | B60G 17/0162 |

(Continued)

FOREIGN PATENT DOCUMENTS

| | | |
|---|---|---|
| DE | 102006056632 A1 | 3/2007 |
| DE | 102021105802 A1 | 11/2021 |

(Continued)

OTHER PUBLICATIONS

Great Britain Intellectual Property Office, Combined Search and Examination Report under Sections 17 & 18(3) Issued in Application No. GB2206585.8, Oct. 20, 2022, 5 pages.

(Continued)

*Primary Examiner* — Kurt Philip Liethen
(74) *Attorney, Agent, or Firm* — McCoy Russell LLP

(57) ABSTRACT

A control system for a vehicle suspension system comprises one or more controllers and is configured to: receive a total roll signal indicative of a total roll moment of the vehicle, the roll moment determined in dependence on a lateral acceleration of the vehicle; receive a spring stiffness signal indicative of a non-active roll moment component of the vehicle, the non-active roll moment component dependent on a current spring stiffness mode of plural available spring stiffness modes of the variable stiffness spring system; determine a target active roll moment component of the vehicle, in dependence on the total roll moment and the non-active roll moment component; and output an active roll control signal indicative of the target active roll moment component to the active roll control system to control the roll moment of the vehicle.

14 Claims, 6 Drawing Sheets

(58) Field of Classification Search
CPC .......... B60G 2800/012; B60G 2500/22; B60G 2800/87; B60G 21/0555; B60G 17/02; B60G 17/0162; B60G 2800/70; B60W 30/04; B60W 2030/043
See application file for complete search history.

(56) References Cited

U.S. PATENT DOCUMENTS

| | | | | |
|---|---|---|---|---|
| 11,161,383 | B1 * | 11/2021 | Saylor | B60G 17/0155 |
| 11,904,648 | B2 * | 2/2024 | Graus | B60G 15/06 |
| 2003/0075881 | A1 * | 4/2003 | Delorenzis | B60G 17/0432 280/5.5 |
| 2005/0023789 | A1 | 2/2005 | Suzuki et al. | |
| 2005/0067213 | A1 * | 3/2005 | Yasui | B60G 21/0555 180/443 |
| 2017/0210191 | A1 * | 7/2017 | Saeger | B60G 11/27 |
| 2020/0269854 | A1 | 8/2020 | Wei et al. | |
| 2022/0134835 | A1 * | 5/2022 | Izak | B60G 21/0553 701/38 |

FOREIGN PATENT DOCUMENTS

| | | | | |
|---|---|---|---|---|
| EP | 1707407 | A1 | | 10/2006 |
| EP | 1719643 | A1 | | 11/2006 |
| JP | 2006007803 | A | * | 1/2006 |
| JP | 2012136111 | A | * | 7/2012 |
| JP | 2012148681 | A | | 8/2012 |
| JP | 2012218589 | A | | 11/2012 |
| KR | 102247470 | B1 | | 4/2021 |

OTHER PUBLICATIONS

ISA European Patent Office, International Search Report and Written Opinion Issued in Application No. PCT/EP2023/061549, Aug. 18, 2023, WIPO, 16 pages.

European Patent Office, Office Action Issued in Application No. 23724715.0, Jan. 15, 2026, Germany, 7 pages.

* cited by examiner

408 ——— no EARC, no ASV
410 - - - - - no EARC, with ASV
412 — — — with EARC, no ASV
414 ········· with EARC, with ASV

VEHICLE ROLL CONTROL

CROSS REFERENCE TO RELATED APPLICATIONS

The present application is a U.S. National Phase of International Application No. PCT/EP2023/061549 entitled "VEHICLE ROLL CONTROL," and filed on May 2, 2023. International Application No. PCT/EP2023/061549 claims priority to Great Britain Patent Application No. 2206585.8 filed on May 5, 2022. The entire contents of each of the above-listed applications are hereby incorporated by reference for all purposes.

TECHNICAL FIELD

The present disclosure relates to vehicle suspension systems; in particular, systems comprising active suspension systems, for example comprising an active roll control system and a variable stiffness spring system. Aspects relate to control systems for such vehicle suspension systems, vehicle suspension systems, vehicles, methods and computer software, as claimed in the appended claims.

BACKGROUND

Vehicles (e.g. petrol, diesel, electric, hybrid) may comprise active suspension systems for maintaining vehicle stability and ride comfort. Active suspension systems may comprise electronic active roll control systems to control the roll characteristics of the vehicle. An electronic active roll control system may comprise actuators coupled to respective anti-roll bars, with the actuators configured to actively impart motor control on the suspension system to act to resist roll when the vehicle is turning.

Active suspension systems may comprise dynamic air springs as part of the suspension system which can provide variable spring stiffness. A dynamic air spring may comprise a set of physical volumes which are connected via adjustable restrictions connectable via respective valves. This allows for separate spring rates (stiffnesses) to be effected by having the valves closed or open adjust the air volume used in the air spring.

It may be advantageous to be able to control the roll characteristics of a vehicle using the available systems of a vehicle in a coordinated way. It is an aim of the present disclosure to address one or more of the disadvantages associated with the prior art.

SUMMARY OF THE INVENTION

In an aspect there is provided a control system for a vehicle suspension system of a vehicle, the vehicle suspension system comprising an active roll control system and a variable stiffness spring system, the control system comprising one or more controllers, the control system configured to: receive a total roll signal indicative of a total roll moment of the vehicle, the total roll moment determined in dependence on a lateral acceleration of the vehicle; receive a spring stiffness signal indicative of a non-active roll moment component of the vehicle, the non-active roll moment component dependent on a current spring stiffness mode of plural available spring stiffness modes of the variable stiffness spring system; determine a target active roll moment component of the vehicle, in dependence on the total roll moment and the non-active roll moment component; and output an active roll control signal indicative of the target active roll moment component to the active roll control system to control the roll moment of the vehicle.

Advantageously, a consistent roll rate may be achieved by considering what the air springs are doing to the vehicle roll and compensating for this in the control of the active roll control system to achieve a total roll of the vehicle. Advantageously, the active roll control system may consume less energy as part of the roll control is achieved by the springs which is accounted for in the roll provided by the active roll control system.

The total roll moment of the vehicle may comprises the sum of the non-active roll moment component and the target active roll moment component.

The control system may be configured to: determine that a change of the current spring stiffness mode occurs; if the non-active roll moment component is increased due to the change of the current spring stiffness mode, determine a decrease in the target active roll moment component; and if the non-active roll moment component is decreased due to the change of the current spring stiffness mode, determine an increase in the target active roll moment component.

Advantageously, the control system can adjust for variations in the non-active roll moment due to the variable stiffness springs by adjusting the active roll controlled moment.

The control system may be configured to determine that the change of the current spring stiffness mode occurs by one or more of: monitoring the current spring stiffness mode; and receiving a signal indicative of the change of the current spring stiffness mode.

The control system may be configured to: receive a further spring stiffness signal indicative of a further non-active roll moment component of the vehicle, the further non-active roll moment component caused by a change in current spring stiffness mode of the variable stiffness spring system; in response to receipt of the further spring stiffness signal, determine a further target active roll moment component of the vehicle in dependence on the total roll moment and the further non-active roll moment component; and output a further active roll control signal indicative of the further target active roll moment component to the active roll control system to control the roll moment of the vehicle.

Advantageously, if the air springs change spring stiffness mode (e.g. firm to soft) then the active roll control system can adapt to compensate to the change in roll moment provided by the springs and maintain a consistent roll moment/angle.

The spring stiffness signal may indicate that the variable stiffness spring system is operating in a soft spring stiffness mode or a firm spring stiffness mode. Advantageously, the system can adapt to discrete switches/step changes in vehicle moment due to spring stiffness changes by controlling the active roll control system to adjust the vehicle moment component induced by the active roll control system.

When the further spring stiffness signal is indicative of the further non-active roll moment providing a reduction in the non-active roll moment component of the vehicle due to a change in the current spring stiffness mode from a firm stiffness mode to a soft stiffness mode, the control system may be configured to determine a further target active roll moment component of the vehicle which is increased compared with the target active roll moment component. When the further spring stiffness signal is indicative of the further non-active roll moment providing an increase in the non-active roll moment component of the vehicle due to a change in the current spring stiffness mode from a soft stiffness mode to a firm stiffness mode, the control system may be configured to determine a further target active roll moment component of the vehicle which is decreased compared with the target active roll moment component. Thus a balanced overall moment may be obtained, by reducing the active roll control provided moment when the moment provided by the variable stiffness springs are higher, and vice versa.

The total roll moment may be determined according to a vehicle model. The vehicle model may be determined by one or more of computer simulation of the vehicle motion and control data obtained from a vehicle driving on a control course.

The total roll moment may increase as lateral acceleration increases. The total roll moment may correspond to a target roll angle by a moment-angle relation.

The non-active roll moment component may comprise: a spring moment component due to the spring stiffness mode of the variable stiffness spring system; and at least one other non-active moment component due to at least one further non-active element of the vehicle suspension system. The at least one other non-active element may comprise one or more of: a damper; a passive element, or a non-active element.

The control system may be configured to perform a determination of the total roll moment in dependence on the lateral acceleration of the vehicle; and receive the total roll signal as a result of the determination.

In an aspect there is provided a vehicle suspension system of a vehicle, comprising:

any control system described herein;

an active roll control system; and a variable stiffness spring system.

The variable stiffness spring system may comprise one or more multiple chamber air springs configured to provide a plurality of different spring stiffness modes in dependence on the chamber configuration of the multiple chambers of the air springs. The variable stiffness spring system may comprise at least one multi-chamber air spring comprising a first chamber and a second chamber and a valve therebetween.

In an aspect there is provided a vehicle comprising any control system disclosed herein, or any vehicle suspension system disclosed herein.

In an aspect there is provided a method of operation of a control system for vehicle suspension system of a vehicle, the vehicle suspension system comprising an active roll control system and a variable stiffness spring system, the method comprising:

receiving a total roll signal indicative of a total roll moment of the vehicle, the total roll moment determined in dependence on a lateral acceleration of the vehicle;

receiving a spring stiffness signal indicative of a non-active roll moment component of the vehicle, the non-active roll moment component dependent on a current spring stiffness mode of plural available spring stiffness modes of the variable stiffness spring system;

determining a target active roll moment component of the vehicle, in dependence on the total roll moment and the non-active roll moment component; and outputting an active roll control signal indicative of the target active roll moment component to the active roll control system to control the roll moment of the vehicle.

The method of operation of a control system may comprise determining that a change of the current spring stiffness mode indicative of the non-active roll moment component of the vehicle occurs by one or more of: monitoring the current spring stiffness mode; and receiving a signal indicative of the change of the current spring stiffness mode.

In an aspect there is provided computer software which, when executed on a processor of any control system disclosed herein is arranged to perform any method disclosed herein.

In an aspect there is provided a non-transitory, computer-readable storage medium storing instructions thereon that, when executed by one or more electronic processors of any control system disclosed herein, causes the one or more electronic processors to carry out any method disclosed herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more examples will now be described, by way of example only, with reference to the accompanying drawings, in which.

DETAILED DESCRIPTION

Vehicles (e.g. petrol, diesel, electric, hybrid) may comprise active suspension systems for maintaining vehicle stability and ride comfort. Active suspension systems may comprise electronic active roll control systems to control the roll characteristics of the vehicle. An electronic active roll control system, as illustrated in FIG. 2*b*, may comprise actuators coupled to respective anti-roll bars, and the actuators are configured to actively impart motor control on the suspension system. The actuators acts to provide an actively controlled torque rather than a fixed torsional stiffness provided by passive anti-roll bars.

Figure 2A:
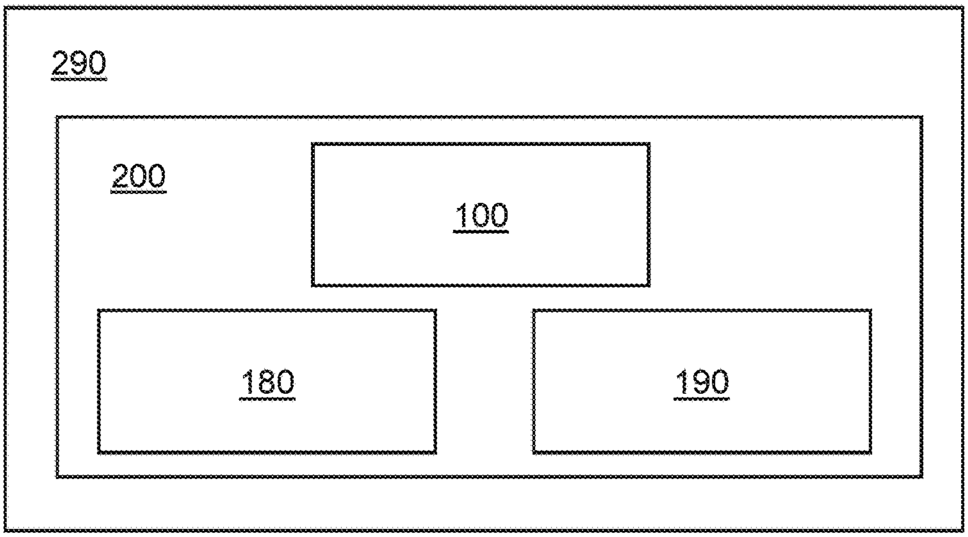
FIG. 2*a* shows, schematically, a vehicle suspension system including an active roll control system and a variable stiffness spring system, according to examples disclosed herein.
Figure 2B:
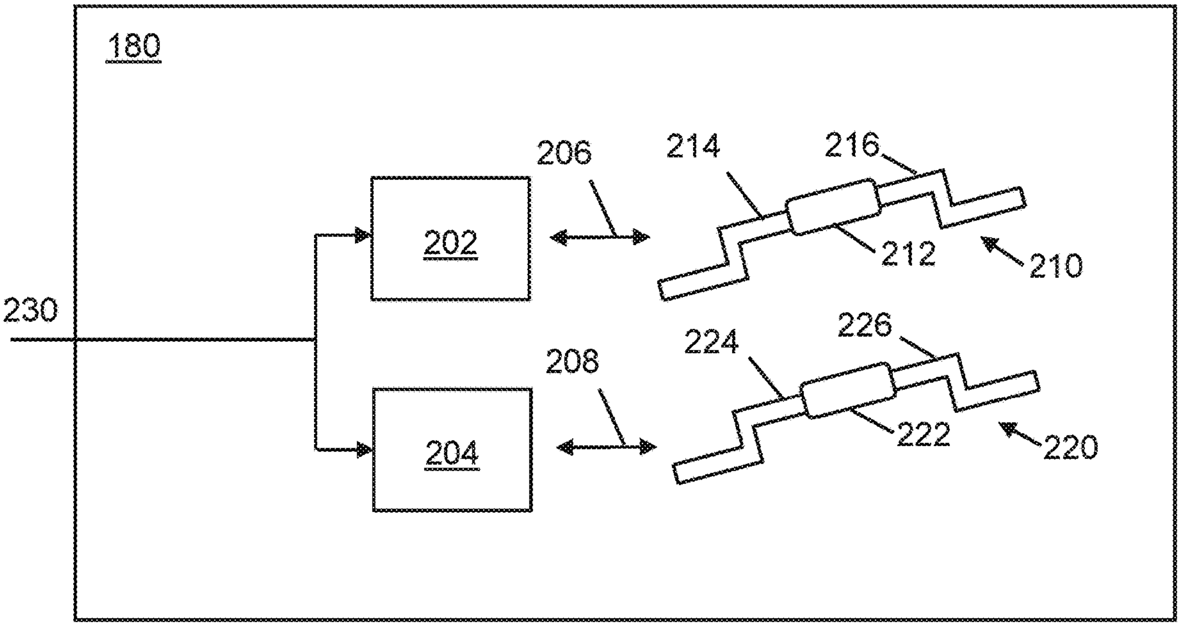
FIG. 2*b* shows, schematically, a high level overview of active roll control system, according to examples disclosed herein.
Figure 2C:
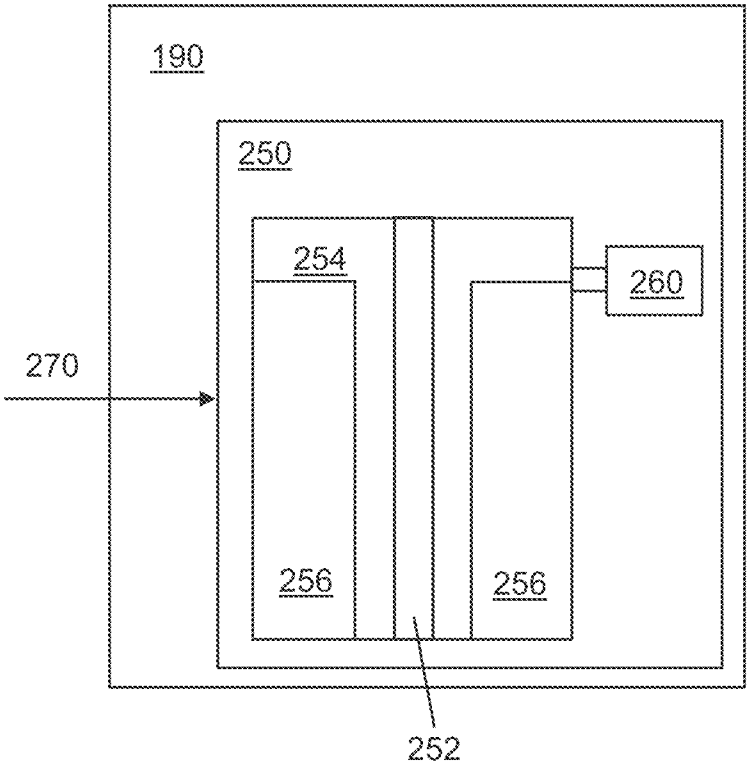
FIG. 2*c* shows, schematically, a high level overview of a variable stiffness spring system, according to examples disclosed herein.

Active suspension systems may comprise dynamic air springs, as illustrated in FIG. 2*c*, as part of the suspension system which can provide variable spring stiffness. A dynamic air spring comprises a set of physical volumes which are connected via adjustable restrictions connectable via respective valves. This allows for separate spring rates (stiffnesses) to be effected by having the valves closed or open adjust the air volume used in the air spring.

It may be advantageous to be able to control the roll characteristics of a vehicle using the available systems of a vehicle in a coordinated way. For example, by taking account of the operation of the air springs, the operation of the active roll control system may be tuned accordingly so that the two systems together provide the required roll control of the vehicle.

Figure 1:
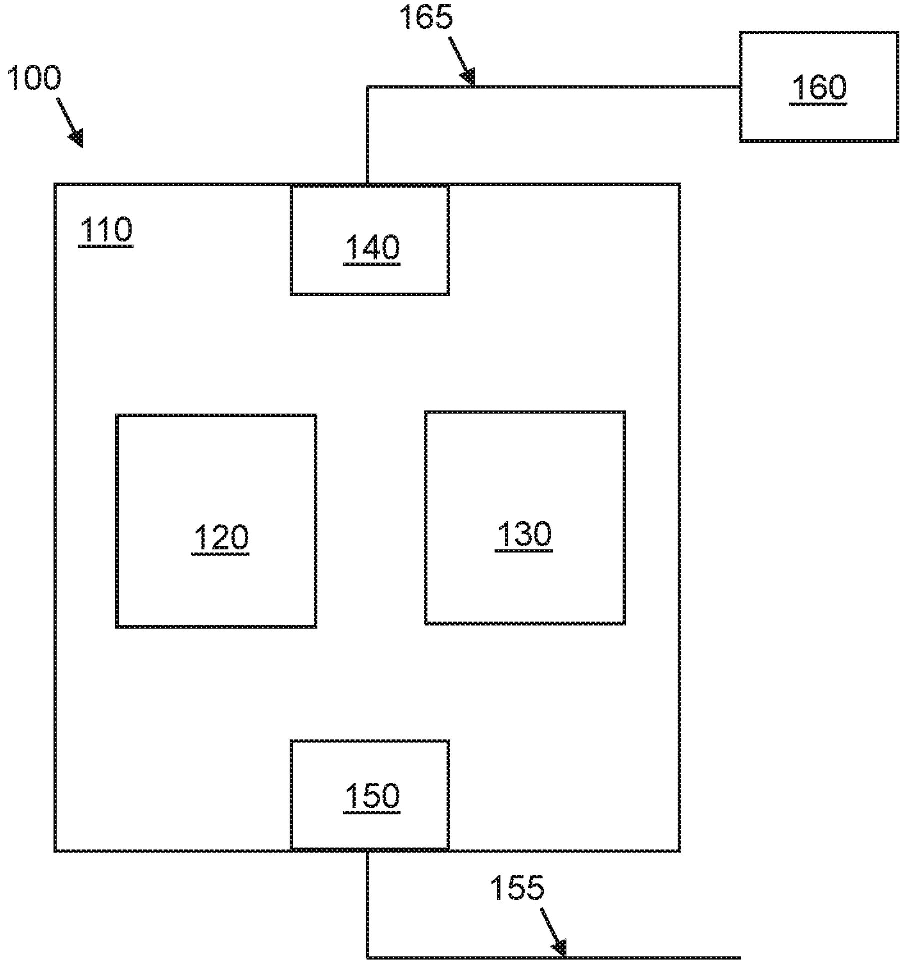
FIG. 1 shows a control system according to examples disclosed herein.

FIG. 1 shows a control system 100 for a vehicle suspension system of a vehicle. The vehicle may be a wheeled vehicle, such as an automobile, or may be another type of vehicle. The vehicle suspension system comprises an active roll control system (which may be considered to contribute to an active roll control part of the suspension system) and a variable stiffness spring system (which may be considered to contribute to a non-active roll control part of the suspension system).

The control system 100 comprises one controller 110, although in other examples there may be plural controllers 110. The controller 110 comprises processing means 120 and memory means 130. The processing means 120 may be one or more electronic processing device 120 which operably executes computer-readable instructions. The memory means 130 may be one or more memory device 130. The memory means 130 is electrically coupled to the processing means 120. The memory means 130 is configured to store instructions, and the processing means 120 is configured to access the memory means 130 and execute the instructions stored thereon.

The controller 110 comprises an input means 140 and an output means 150. The input means 140 may comprise an electrical input 165 of the controller 110. The output means 150 may comprise an electrical output 155 of the controller 110. The input 140 is arranged to receive one or more input signals via the electrical input 165, for example from an external computing device 160.

The control system 100 is configured to receive a total roll signal indicative of a total roll moment $M_x$ of the vehicle. The total roll moment $M_x$ is determined in dependence on a lateral acceleration $a_y$ of the vehicle. That is, the control system receives an input indicating a total roll for the vehicle, which depends on the vehicle's lateral acceleration.

The control system 100 is also configured to receive a spring stiffness signal indicative of a non-active roll moment component $M_{NA}$ of the vehicle. The non-active roll moment component $M_{NA}$ is dependent on a current spring stiffness mode, of plural available spring stiffness modes of the variable stiffness spring system. That is, the spring stiffness of the variable stiffness spring system of the vehicle suspension system contributes a "non-active" portion to the overall vehicle moment, and this contribution is received as input by the control system. By "receive a spring stiffness signal", in some examples this may mean that a signal is received by the control system 100 from a separate controller that determines what the non-active roll moment component $M_{NA}$ is. In some examples, "receive a spring stiffness signal" may be understood to mean that the control system 100 determines the variable spring stiffness setting (e.g. soft, firm), for example as a function of lateral acceleration and rate of change of lateral acceleration. Then, the control system 100 may account for both the variable stiffness springs and the active roll control to achieve the total roll moment, by, for example, taking the variable stiffness spring state at each corner of the vehicle to estimate the overall "non active" roll moment, and subtract it from the total roll moment $M_x$ to obtain the "active" roll moment $M_A$ to provide to the active roll control system.

The estimation of the "non active" roll moment may be calculated based on the force-displacement characteristic of the variable stiffness springs and any other non-active suspension elements. That displacement characteristic may be calculated based on the target roll angle. A higher roll angle target means $M_{NA}$ may be higher and therefore $M_A$ (which may equal $M_X-M_{NA}$) would be smaller.

The "non-active" portion in some examples may itself be considered to comprise a) a "passive" portion of the overall vehicle moment, such as that provided by mechanical springs over which there is no active control and which react passively to the vehicle moment, and b) a "controllable non-active" portion, which may be controlled to some extent, such as changing the spring stiffness of variable stiffness springs via electronic control, but which is not a real-time reactive system as the active roll control may be considered to be.

The control system 100 is then configured to determine a target active roll moment component $M_A$ of the vehicle, in dependence on the total roll moment $M_x$ and the non-active roll moment component $M_{NA}$. There is a relationship between the target active roll moment component $M_A$ which the control system is configured to determine, the total roll moment $M_x$ of the vehicle overall, and the non-active roll moment component $M_{NA}$. The relationship may be, for example, $M_x=M_{NA}+M_A$.

The control system 100 is configured to output an active roll control signal indicative of the target active roll moment component $M_A$ to the active roll control system to control the roll moment of the vehicle. That is, the control system 100 is aware of what the total overall roll moment $M_x$ for the vehicle should be for the lateral acceleration of the vehicle, and is aware of the non-active roll moment contribution $M_{NA}$; from these values the control system 100 can determine the active roll moment contribution $M_A$ and can control the active roll control system to provide the determined active roll moment contribution $M_A$ to achieve the total overall roll moment $M_x$.

The control system 100 may therefore control the roll properties of the vehicle by way of controlling the behaviour of the active roll control system by taking into account the properties of the variable stiffness spring system, and the lateral acceleration of the vehicle on which the roll moment depends. A consistent roll rate may be achieved by considering what the air springs of the variable stiffness spring system are doing to the vehicle roll, and compensating for this in the control of the active roll control system to achieve a total roll of the vehicle. The active roll control system may require less energy to operate than if the properties of the variable stiffness spring system are not accounted for, because part of the roll control is achieved by the air springs of the variable stiffness spring system which is accounted for in the roll provided by the active roll control system.

In reality, the total roll moment $M_X$ may not be a fixed value for a given lateral acceleration, as there may be a small dependency on the position of the centre of gravity of the vehicle during cornering, which can move as a function of the roll angle target of the vehicle. In some example vehicle models, this effect may be neglected. However, examples disclosed herein may take it into account (that is, the control system may take account for the change in the centre of gravity). The total roll moment $M_X$ may be considered to be a “magnitude” or “state” of the vehicle which arises as a result of being subject to cornering forces. The total roll moment $M_X$ is a parameter arising from the behaviour of the vehicle. On the other hand, the roll angle of the vehicle is a target which is provided to the active roll control system to achieve the total roll moment $M_X$. A high roll angle target (i.e. the vehicle rolls more) means that the active roll moment contribution (e.g. $M_A=M_X-M_{NA}$) will be smaller because the non-active roll moment contribution $M_{NA}$ will be higher due to a higher roll resulting in a higher deflection on the springs. Additionally, if the variable stiffness springs are in a high stiffness state, the non-active roll moment contribution $M_{NA}$ will be higher making the active roll moment contribution $M_A$ smaller as a result. The consideration of the variable stiffness spring state in the estimation of the non-active roll moment contribution $M_{NA}$ allows for the integrated roll control strategy between the variable stiffness spring system and the active roll control system, which can advantageously allow for improved accuracy of control of the roll angle target, and provide consistency in the roll control algorithm regardless of the variable stiffness spring system operation including during transient roll manoeuvres.

An integrated roll angle control can thus be achieved by a combined control strategy that uses both the active roll control system and the variable stiffness spring system. By having a total roll control force, for example as obtained from a model of the vehicle, and then using a spring roll control force which depends on the variable stiffness spring state (e.g. soft/low or firm/high stiffness), the control system 100 can control the active roll control system to tailor its roll control force to achieve a target vehicle roll angle, accounting for the tuning of the variable stiffness springs. Also, when the variable stiffness spring system is adjusted to operate in a soft variable spring stiffness state from a firm variable spring stiffness state, for example due to dynamic driving conditions (e.g. exiting a bend in firm spring stiffness state, then opening the variable spring valve on the straight to obtain a softer spring stiffness), the active roll control system can be controlled to compensate for any roll angle discontinuities that may arise from the variable stiffness spring system changing spring stiffness, and keep the target roll angle, smoothing the roll out from the bend. Thus examples disclosed herein may provide additional refinements in controlling the roll angle of a vehicle.

FIG. 2*a* shows, schematically, a vehicle suspension system 290 including an active suspension system 200. The vehicle suspension system 290 may comprise other elements, such as passive springs or dampers, or one or more sensors, for example. The active suspension system 200 comprises a control system 100 such as that described in relation to FIG. 1, an active roll control system 180, and a variable stiffness spring system 190. The active suspension system 200 may comprise other elements, such as electronic dampers, for example. The active roll control system 180 comprises anti-roll bars, as discussed in relation to FIG. 2*b*. The variable stiffness spring system 190 comprises one or more multiple chamber air springs configured to provide a plurality of different spring stiffness modes in dependence on the chamber configuration of the multiple chambers of the air springs, as discussed in relation to FIG. 2*c*.

FIG. 2*b* shows, schematically, a high level overview of active roll control system 180, according to examples disclosed herein. An active roll control system 180 acts to control anti-roll bars 210, 220, to control a roll of a body of the vehicle and reduce the impact of disturbances from a road surface and to compensate for vehicle movements such as body roll, for example from driving around a corner. The anti-roll control system 180 may be electromechanical and/or hydraulic.

In a vehicle with an active roll control system 180, control signals 230 may be received and sent to active roll controllers 202; 204 configured to control a respective anti-roll bar 210; 220. An anti-roll bar 210; 220 may respectively comprise two anti-roll bar ends 214, 216; 224, 226 connected together by a central housing having an actuator 212; 222. The central housing may additionally have one or more of a gearbox, sensors, and dedicated actuator controllers. An actuator 212 provided between a front pair of wheels of a vehicle may be called a front actuator. A front active roll control (FARC) module may be electrically connected 206 to the front actuator 212, and may comprise the controller 202 to control the front actuator 212. Similarly, an actuator 222 provided between a rear pair of wheels of a vehicle may be called a rear actuator. A rear active roll control (RARC) module may be electrically connected 208 to the rear actuator 222 and may comprise a controller 204 to control the rear actuator 222.

One or more sensors may monitor the movement of the vehicle, and provide the sensed parameters as input 230 to the active roll control system 180 via controllers 202; 204 to control the actuators 212; 222 and provide a suitable torque to the respective anti-roll bars 210; 220. Throughout this disclosure, the term “anti-roll bar” is used and is synonymous with the terms “roll bar”, “anti-sway bar”, “sway bar” or “stabilizer bar”.

FIG. 2*c* shows, schematically, a high level overview of a variable stiffness spring system 190 comprising a dynamic air spring 250, according to examples disclosed herein. A dynamic air spring 250 may also be called an adaptive air spring, multi-chamber air spring, variable stiffness spring, or an additional switchable volume (ASV) air spring. Such air springs 250 comprise a set of physical volumes which are connected via adjustable restrictions. In this example one multi-chamber air spring 250 is illustrated but the variable stiffness spring system 190 may comprise plural multi-chamber air springs 250, e.g. one per wheel. FIG. 2*c* is schematic: the relative volume sizes of the different air chambers 254, 256 is not to scale, and may not be representative of actual volume sizes or volume ratios between different air chambers in real air springs.

FIG. 2*c* shows a multi-chamber air spring 250 comprising a spring rod 252, a first air chamber 254 and a second air chamber 256, and a valve 260. The spring rod 252 sits in the centre of the assembly 250, and the air spring comprising the chambers 254, 256 encapsulates it. When the valve 260 is closed, the first and second air chambers 254, 256 are separated from each other. When the valve 260 is open, the first and second air chambers 254, 256 are connected and an air spring force is achieved due to air in the first and second chambers 254, 256 together. By switching the air chamber volume available, the air spring stiffness is changed to provide different possible air spring force effects. The larger the available air volume (e.g. when the first air chamber 254 and the second air chamber 256 are connected by an open valve 260), the softer the air spring is. The smaller the air volume (e.g. when the first air chamber 254 is separated from the second air chamber 256 by the valve 260 so first air chamber 254 is available to provide an air spring force, but the second air chamber 256 is not available), the stiffer the air spring 250 is.

The example multi-chamber air spring 250 shown comprises two volumes 254, 256 connected via one valve 260, such as an electronically adjustable valve. This allows for separate spring rates (stiffnesses) to be effected by having the valve 260 closed or open. Another example multi-chamber air spring may comprise three volumes, connected via two valves such as electronically adjustable valves. This allows for more possible separate spring rates (stiffnesses) by having the valves closed or open in different combinations. In some examples, the multi-chamber air spring 250 may be physically separate from the damper, although in other examples, the multi-chamber air spring 250 and damper may be combined into a single assembly. In a single assembly example, a damper rod of the damper may be at a similar level/height to the spring rod 252 in the assembly, with much or all of the remaining damper unit below and coaxial with the spring rod 252.

Figure 3:
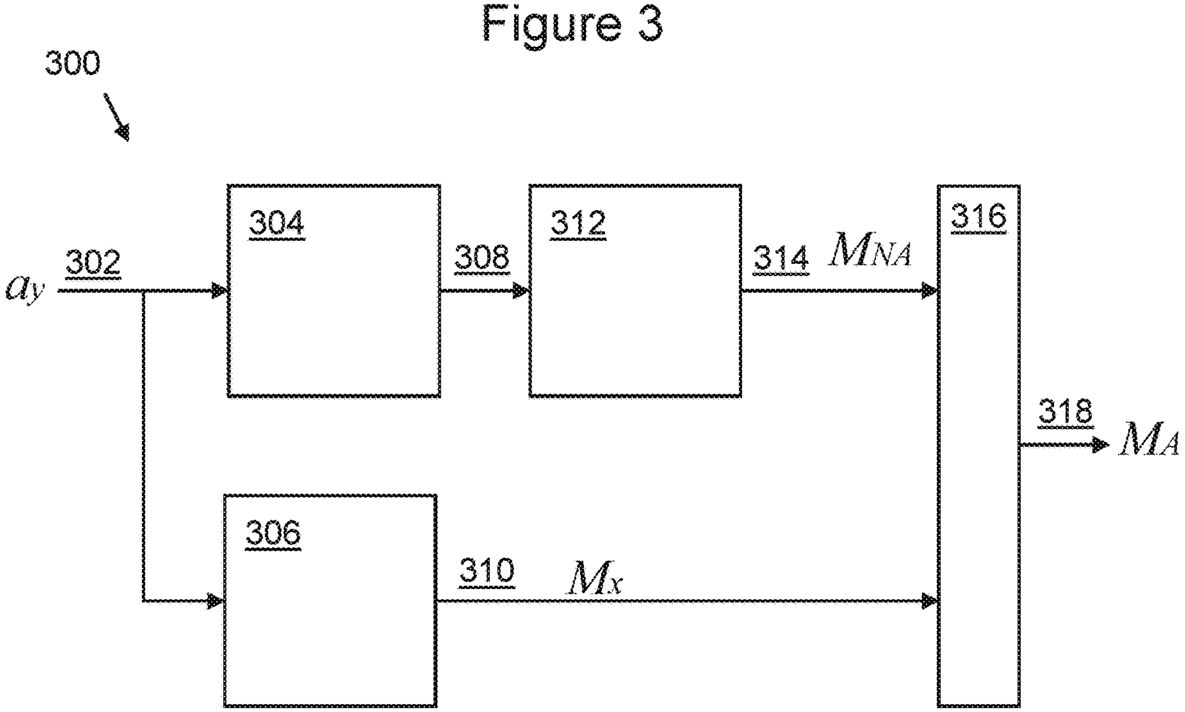
FIG. 3 illustrates a process flow indicating how a target roll angle may be achieved according to examples disclosed herein.
Figure 3:
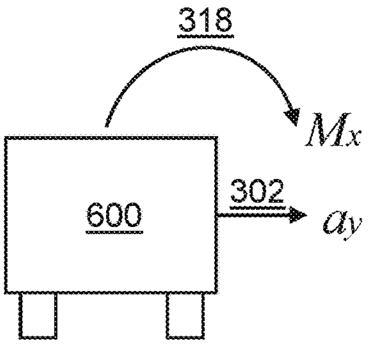

FIG. 3 illustrates a process flow 300 indicating how a target roll angle, or moment $M_x$ 310, may be achieved according to examples disclosed herein. The process flow may be carried out by control systems 100 described herein. The inset schematically shows a front/rear view of a vehicle 600 which is experiencing a lateral acceleration $a_y$ 302 to the right. A corresponding total vehicle roll moment $M_x$ 310 of the vehicle therefore also arises which tends to tilt the vehicle to the right. A target roll angle of the vehicle body, and a total vehicle roll moment $M_x$ 310, are different ways of expressing the same property of a tilt of the vehicle body due to a lateral acceleration $a_y$ 302. Therefore where a moment is obtained this may be converted to a tilt angle. That is, a total roll moment may correspond to a target roll angle through an appropriate relationship. In a vehicle with no active roll control system, there may be a direct correspondence between the roll moment and the roll angle (assuming steady state cornering without consideration of transient behaviour). However, on a vehicle with active roll control systems that can actively affect the roll of the car such as described herein, the vehicle's body roll angle can be controlled to a target roll angle, therefore there may not be a direct correspondence between target roll angle and roll moment. The total roll moment (and in some examples also the target roll angle) may therefore increase as lateral acceleration increases, at least under some conditions. In some examples, the target roll angle may be actively controlled by any value within the active system capabilities—for example, the target roll angle may decrease as lateral acceleration increases within a low lateral acceleration range, for example from 0 to 2 $ms^{-2}$.

The total roll moment $M_x$ 310 of the vehicle may comprise a combination of a non-active roll moment component $M_{NA}$ 314 arising from non-actively controlled components of the vehicle suspension system (e.g. air springs, dampers, passive suspension elements) and the target active roll moment component $M_A$ 318 arising from actively controllable components of the vehicle suspension system (e.g. active suspension elements, actively controlled (electronic) roll control bars). For example, the total roll moment $M_x$ 310 may comprise the sum of the non-active roll moment component $M_{NA}$ 314 and the target active roll moment component $M_A$ 318, i.e. $M_x=M_{NA}+M_A$.

The process flow 300 comprises receiving an input lateral acceleration $a_y$ 302 which is provided to a roll gradient target function module 304 and to a vehicle model module 306. The roll gradient target function module 304 is configured to determine a target roll angle 308 for the vehicle to achieve in dependence on the lateral acceleration $a_y$ 302. In some examples, the target roll angle may be called a target gradient, although the term "target roll angle" may be a more accurate term than roll gradient in examples of vehicles using active roll control, because the target roll angle vs lateral acceleration function on vehicles with active systems may be a non-linear relationship. Roll gradient may be more appropriate as an alternative term for roll angle in vehicles without active systems that control roll, because the relationship between roll angle and lateral acceleration may be closer to a linear relationship in these cases.

The target roll angle 308 is provided as input to a non-active elements model module 312. The non-active elements model module 312 uses a model of the non-active elements of the vehicle suspension system, such as the air springs, to account for the air spring state effects on the vehicle roll. The non-active roll moment component may, for example, comprise a spring moment component due to the spring stiffness mode of the variable stiffness spring system, and at least one other non-active moment component due to at least one further non-active element of the vehicle suspension system. The non-active elements model module 312 is configured to output a non-active roll moment component $M_{NA}$ 314 of the vehicle.

The total roll moment $M_x$ 310 may be determined according to a vehicle model. That is, a model (e.g. theoretical and/or empirical) of the vehicle may be used to obtain an ideal total roll moment $M_x$ 310 for the vehicle for a particular lateral acceleration $a_y$ 302 and the control system 100 may retrieve a total roll moment $M_x$ 310 for the vehicle operating under particular conditions (e.g. velocity, lateral acceleration, longitudinal acceleration, mass of vehicle plus occupants). The vehicle model may be determined by computer simulation of the vehicle in motion in some examples. The vehicle model may be determined by control data obtained from a vehicle driving on a control course in some examples, i.e. via a series of test drives to enact particular driving conditions. The vehicle model in some examples may be a combination of computer modelling data and control data.

The vehicle model module 306 is configured to determine a roll torque 310 which the vehicle is subject to in dependence on the lateral acceleration $a_y$ 302. In some examples, the control system 100 may determine a roll torque 310 by retrieving the roll torque from a storage which stores values obtained from a vehicle model. In some examples, the control system 100 may be configured to perform a determination of the total roll moment $M_x$ in dependence on the lateral acceleration $a_y$ 302 of the vehicle 600, for example by running a model, and receive the total roll signal $M_x$ 310 as a result of the determination. The roll torque 310 determined based on the vehicle model 306 is provided to a calculation module 316. The vehicle model module 306 is configured to output a total roll moment $M_x$ 310 of the vehicle.

The calculation module 316 is configured to take, as input, the non-active roll moment component $M_{NA}$ 314 of the vehicle and the total roll moment $M_x$ 310 of the vehicle, and calculate a target active roll moment component $M_A$ 318 of the vehicle. This target active roll moment component $M_A$ 318 may be provided to the active roll control system 180 to cause it to provide a torque corresponding to the determined target active roll moment component $M_A$ of the vehicle.

The process flow 300 may operation continuously, or periodically, i.e. the process may repeat while the vehicle is in use/in motion. The control system 100 may be configured to determine that the change of the current spring stiffness mode occurs by monitoring the current spring stiffness mode in some examples. For example, the control system 100 may send a polling message or similar to a controller of the air springs requesting an indication of the spring stiffness setting and the air springs controller may respond with a signal indicating the spring stiffness or spring operating mode. The control system 100 may be configured to determine that the change of the current spring stiffness mode occurs by receiving a signal indicative of the change of the current spring stiffness mode in some examples. For example, the control system 100 may receive a signal indicative of the spring stiffness mode changing from high to low stiffness or vice versa on a change in spring stiffness taking place.

For example If the non-active roll moment component $M_{NA}$ 314 decreases, then the target active roll moment component $M_A$ 318 may correspondingly increase to maintain the same total roll moment $M_x$ 310. If the non-active roll moment component $M_{NA}$ 314 increases, then the target active roll moment component $M_A$ 318 may correspondingly decrease to maintain the same total roll moment $M_x$ 310. In other words, the control system 100 may be configured to determine that a change of the current spring stiffness mode occurs (which in turn changes the non-active roll moment component $M_{NA}$ 314). If the non-active roll moment $M_{NA}$ 314 component is increased due to the change of the current spring stiffness mode, the control system 100 may determine a decrease in the target active roll moment component $M_A$ 318. If the non-active roll moment component $M_{NA}$ 314 is decreased due to the change of the current spring stiffness mode, the control system 100 may determine an increase in the target active roll moment component $M_A$ 318. In this way, the control system 100 can adjust for variations in the non-active roll moment (due to operation of the variable stiffness springs) by adjusting the active controlled moment using the active roll control system 180.

The control system 100 may act to maintain a total roll moment $M_x$ 310 as estimated by the control system while the vehicle is in use, For example, the control system 100 may determine a target active roll moment component $M_A$ 318 and provide this to the active roll control system 180, to cause it to provide a torque corresponding to the determined target active roll moment component $M_A$ 318 of the vehicle. Once the process flow 300 has been used once to determine an initial target active roll moment component $M_A$ 318, the process may repeat. Thus, the control system 100 may be configured to receive a further spring stiffness signal indicative of a further non-active roll moment component of the vehicle. The further non-active roll moment component may be caused by a change in current spring stiffness mode of the variable stiffness spring system 190 (for example, a switch from high to low spring stiffness), and/or a change in lateral acceleration $a_y$, for example. In response to receipt of the further spring stiffness signal, the control system 100 may determine a further target active roll moment $M_A$ 318 component of the vehicle 600 in dependence on the total roll moment $M_x$ 310 and the further non-active roll moment component $M_{NA}$ 314. The control system 100 may then output a further active roll control signal indicative of the further target active roll moment $M_A$ 318 component to the active roll control system 180 to control the roll moment of the vehicle 600. In short the control system may adapt to changing spring stiffness to maintain the total roll moment $M_x$ 310, to try and maintain a consistent roll moment/angle.

For example, when the further spring stiffness signal is indicative of the further non-active roll moment providing a reduction in the non-active roll moment component $M_{NA}$ 314 of the vehicle due to a change in the current spring stiffness mode from a firm stiffness mode to a soft stiffness mode, the control system 100 may be configured to determine a further target active roll moment component $M_A$ 318 of the vehicle 600 which is increased compared with the target active roll moment component. When the further spring stiffness signal is indicative of the further non-active roll moment providing an increase in the non-active roll moment component $M_{NA}$ 314 of the vehicle 600 due to a change in the current spring stiffness mode from a soft stiffness mode to a firm stiffness mode, the control system 10 may be configured to determine a further target active roll moment component $M_A$ 318 of the vehicle 600 which is decreased compared with the target active roll moment component.

A spring stiffness signal may indicate that the variable stiffness spring system 190 is operating in a soft spring stiffness mode or a firm spring stiffness mode, for example in the case of a two-chamber adaptive air spring such as that illustrated in FIG. 2*c*. In examples using air springs with more than two chambers, the spring stiffness signal may indicate that the variable stiffness spring system 190 is operating in one of plural possible spring stiffness modes, for example, a soft spring stiffness mode, medium spring stiffness more, and a firm spring stiffness mode. The control system 100 can adapt the control of the active roll control system 180 according to discrete switches/step changes in vehicle moment due to spring stiffness changes (e.g. switching from high to low damping) by controlling the active roll control system 180 to adjust the vehicle moment component induced by the active roll control system 180.

Figure 4:
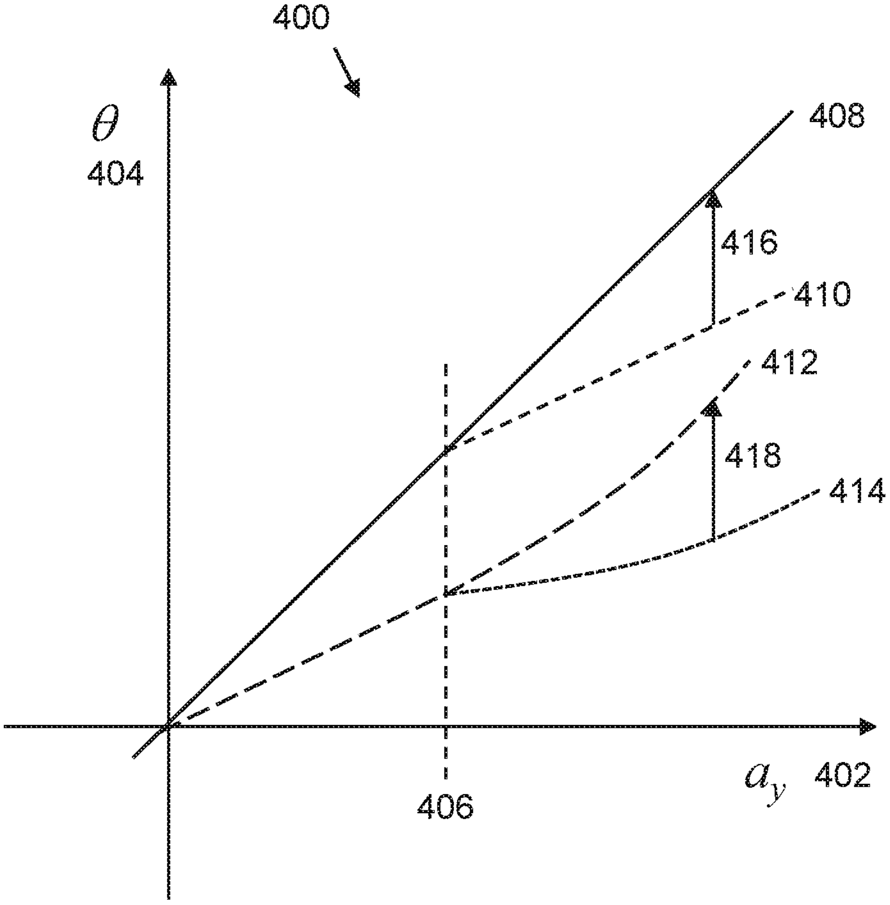
FIG. 4 shows a schematic graph of roll angle against lateral acceleration when different active suspension systems are used to control the roll angle, according to examples disclosed herein.

FIG. 4 shows a schematic graph 400 of lateral acceleration $a_y$ 402 against roll angle q 404 when different active suspension systems are used to control the roll angle q 404, according to examples disclosed herein.

If no active roll control or non-active roll control is used, then the relationship between lateral acceleration $a_y$ 402 against roll angle q 404 may follow curve 408, which in this example is a linear increasing relationship. The lateral acceleration value 406 marked indicates a value of lateral acceleration $a_y$ 402 at which the non-active, variable stiffness spring system switches operation of the variable stiffness springs of the suspension system from a low stiffness to a high stiffness. Thus at this lateral acceleration value 406, the roll angle behaviours of the vehicle can change. If no active roll control is used but non-active roll control (i.e. comprising a variable stiffness spring system) is used, then the relationship between lateral acceleration $a_y$ 402 against roll angle q 404 may tend to follow curve 410. In this example the first portion of the curve 410 follows a linear increasing relationship at a first gradient to the lateral acceleration value 406 at which the variable stiffness springs change stiffness to a firmer spring stiffness. Beyond this lateral acceleration 406, the second portion of the curve 410 follows a linear increasing relationship at a second gradient which is lower than the gradient of the first portion of the curve 410 such that the rate of increase in roll angle is less than in the example in which no non-active roll control system is used, indicated by difference 416.

If active roll control is used, but no non-active roll control (e.g. variable stiffness air springs) is used, then the relationship between lateral acceleration $a_y$ 402 against roll angle q 404 may tend to follow curve 412, which in this example is an increasing relationship. If active roll control is used and non-active roll control is also used, then the relationship between lateral acceleration $a_y$ 402 against roll angle q 404 may tend to follow curve 414. In this example the first portion of the curve 414 follows the increasing relationship of curve 412, and beyond the lateral acceleration 406 at which the variable stiffness springs switch to a high spring stiffness, the second portion of the curve 414 follows an increasing relationship in which the gradient increases with an increase of lateral acceleration 402, although the increase is slower/less than that of the curve 412 for which there is no non-active roll control, so there is a difference 418 in roll angle value dependent on whether the non-active roll control is used or not.

This graph 400 therefore schematically illustrates the effect of active and non-active roll control on the roll angle of the vehicle. Examples disclosed herein, which account for the effect of non-active roll control on the overall roll angle (and therefore roll moment) of the vehicle may allow for smoother vehicle roll control effected by the active roll control system, and may allow for lower energy requirements by the active roll control system because contributions to the roll control by the non-active roll control of the vehicle are accounted for. In addition, an integrated active roll control and variable stiffness spring roll control system may allow the roll angle target to be more accurately achieved. For example, if the roll angle target is represented by curve 412, and if the variable stiffness spring is close to the point 406, then the new curve 414 may result in a roll angle error of the different 418 vs the target relation 412 if the roll control did not consider an integrated control between active roll control and variable stiffness spring. However, with integrated control of the roll control system as described herein, the hypothetical roll angle target curve 412 may be achieved regardless of the variable stiffness spring operation.

Figure 5:
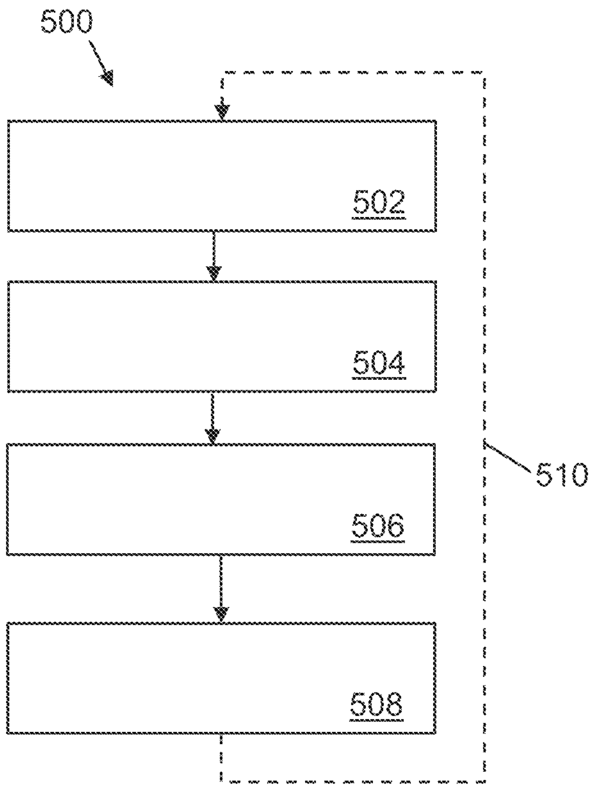
FIG. 5 shows an example method according to examples disclosed herein.

FIG. 5 shows an example method 500 according to examples disclosed herein. The method 500 is a method of operation of a control system for vehicle suspension system 290 of a vehicle 600. The vehicle suspension system 290 comprising an active roll control system 180 and a variable stiffness spring system 190. The method 500 comprises receiving a total roll signal indicative of a total roll moment of the vehicle 502. The total roll moment is determined in dependence on a lateral acceleration of the vehicle. The method 500 comprises receiving a spring stiffness signal indicative of a non-active roll moment component of the vehicle 504. The non-active roll moment component is dependent on a current spring stiffness mode of plural available spring stiffness modes of the variable stiffness spring system. The method 500 comprises determining a target active roll moment component of the vehicle, in dependence on the total roll moment and the non-active roll moment component 506. The method 500 comprises outputting an active roll control signal indicative of the target active roll moment component 508 to the active roll control system to control the roll moment of the vehicle.

The method of operation 500 may further comprise determining that a change of the current spring stiffness mode, indicative of the non-active roll moment component of the vehicle, occurs. This may be performed by monitoring the current spring stiffness mode. This may be achieved by receiving a signal indicative of the change of the current spring stiffness mode. In the event that a change of the current spring stiffness mode is determined to take place, the method may repeat 510 the above described steps 502-508 to determine a new target active roll moment component 508 to control the active roll control system, to adjust for the change in roll moment arising from the non-active roll control components.

The method 500 may be performed by the control system 100 illustrated in FIG. 1. In particular, the memory 130 may comprise computer-readable instructions (e.g. computer software) which, when executed by the processor 120 of a control system 100 disclosed herein, perform a method 500 as disclosed herein. Also disclosed herein is a non-transitory, computer-readable storage medium storing instructions thereon that, when executed by one or more electronic processors of a control system 100 as disclosed herein, causes the one or more electronic processors to carry out a method 500 as disclosed herein.

The blocks illustrated in FIG. 5 may represent steps in a method 500 and/or sections of code in a computer program configured to control the control system as described above to perform the method steps. The illustration of a particular order to the blocks does not necessarily imply that there is a required or preferred order for the blocks and the order and arrangement of the block may be varied. Furthermore, it may be possible for some steps to be omitted or added in other examples.

Figure 6:
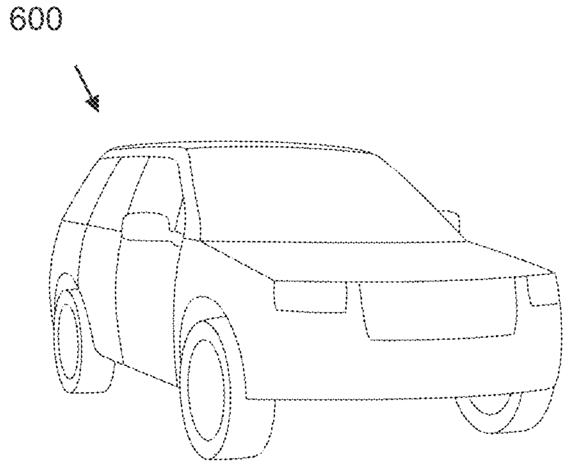
FIG. 6 illustrates an example vehicle according to examples disclosed herein.

FIG. 6 illustrates an example vehicle 600 according to examples disclosed herein, e.g. comprising a control system 100, or vehicle suspension system 290 as disclosed herein. The vehicle 600 in the present embodiment is an automobile, such as a wheeled vehicle, but it will be understood that the control system 100 and vehicle suspension system 290 may be used in other types of suitable vehicle 600.

As used here, 'connected' means either 'mechanically connected' or 'electrically connected' either directly or indirectly. Connection does not have to be galvanic. Where the control system is concerned, connected means operably coupled to the extent that messages are transmitted and received via the appropriate communication means. The term "control system" may be understood to cover a controller, control module, or control element and need not necessary be a multi-element or distributed system (although it may be in some examples).

It will be appreciated that various changes and modifications can be made to the present disclosed examples without departing from the scope of the present application as defined by the appended claims. Whilst endeavouring in the foregoing specification to draw attention to those features believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for a vehicle suspension system of a vehicle, the vehicle suspension system comprising an active roll control system and a variable stiffness spring system comprising a multiple chamber air spring configured to provide a plurality of different spring stiffness modes in dependence on a chamber configuration of the multiple chamber air spring, wherein the chamber configuration is determined by a valve state of a valve between a first chamber and a second chamber of the multiple chamber air spring, such that opening or closing the valve produces a discrete step change in spring stiffness of the multiple chamber air spring, the control system comprising one or more controllers, the control system configured to:

receive a total roll signal indicative of a total roll moment of the vehicle, the total roll moment determined in dependence on a lateral acceleration of the vehicle;

receive a spring stiffness signal indicative of a non-active roll moment component of the vehicle, the non-active roll moment component dependent on a current spring stiffness mode of the plurality of different spring stiffness modes of the variable stiffness spring system, the current spring stiffness mode determined by the valve state;

determine a target active roll moment component of the vehicle, in dependence on the total roll moment and the non-active roll moment component, and, upon determining that a change in the valve state has caused a discrete step change in the non-active roll moment component, adjust the target active roll moment component to compensate for the discrete step change in the non-active roll moment component to maintain a target roll angle of the vehicle; and output an active roll control signal indicative of the adjusted target active roll moment component to the active roll control system to control the roll moment of the vehicle.

2. The control system of claim 1, wherein the total roll moment of the vehicle comprises a sum of the non-active roll moment component and the target active roll moment component.

3. The control system of claim 1, wherein the control system is further configured to:

determine that the change in the valve state and thus of the current spring stiffness mode occurs;

if the non-active roll moment component is increased due to the change of the current spring stiffness mode, decrease the target active roll moment component to generate the adjusted target active roll moment component; and if the non-active roll moment component is decreased due to the change of the current spring stiffness mode, increase the target active roll moment component to generate the adjusted target active roll moment component.

4. The control system of claim 3, wherein the control system is further configured to determine that the change of the current spring stiffness mode occurs by one or more of:

monitoring the current spring stiffness mode; and receiving a signal indicative of the change of the current spring stiffness mode.

5. The control system of claim 1, wherein the spring stiffness signal indicates that the variable stiffness spring system is operating in a soft spring stiffness mode or a firm spring stiffness mode.

6. The control system of claim 1, wherein the spring stiffness signal indicates that the variable stiffness spring system is operating in a soft spring stiffness mode when the valve state is open or a firm spring stiffness mode when the valve state is closed; and wherein when the further spring stiffness signal is indicative of the further non-active roll moment providing a reduction in the non-active roll moment component of the vehicle due to a change in the current spring stiffness mode from the firm spring stiffness mode to the soft spring stiffness mode due to the valve opening, the control system is configured to determine a further the adjusted target active roll moment component of the vehicle which is increased compared with the target active roll moment component, and when the further spring stiffness signal is indicative of the further non-active roll moment providing an increase in the non-active roll moment component of the vehicle due to a change in the current spring stiffness mode from the soft spring stiffness mode to the firm spring stiffness mode due to the valve closing, the control system is configured to determine the adjusted target active roll moment component of the vehicle which is decreased compared with the target active roll moment component.

7. The control system of claim 1, wherein the total roll moment is determined according to a vehicle model.

8. The control system of claim 1, wherein the non-active roll moment component comprises:

a spring moment component due to the current spring stiffness mode of the variable stiffness spring system; and at least one other non-active moment component due to at least one further non-active element of the vehicle suspension system.

9. A vehicle suspension system of a vehicle, comprising:

the control system of claim 1;

the active roll control system; and the variable stiffness spring system.

10. A vehicle comprising the vehicle suspension system according to claim 9.

11. A method of operation of a control system for vehicle suspension system of a vehicle, the vehicle suspension system comprising an active roll control system and a variable stiffness spring system comprising a multiple chamber air spring configured to provide a plurality of different spring stiffness modes in dependence on a chamber configuration of the multiple chamber air spring, wherein the chamber configuration is determined by a valve state of a valve between a first chamber and a second chamber of the multiple chamber air spring, such that opening or closing the valve produces a discrete step change in spring stiffness of the multiple chamber air spring, the method comprising:

receiving a total roll signal indicative of a total roll moment of the vehicle, the total roll moment determined in dependence on a lateral acceleration of the vehicle;

receiving a spring stiffness signal indicative of a non-active roll moment component of the vehicle, the non-active roll moment component dependent on a current spring stiffness mode of the plurality of different spring stiffness modes of the variable stiffness spring system, the current spring stiffness mode determined by the valve state;

determining a target active roll moment component of the vehicle, in dependence on the total roll moment and the non-active roll moment component, and, upon determining that a change in the valve state has caused a discrete step change in the non-active roll moment component, adjusting the target active roll moment component to compensate for the discrete step change in the non-active roll moment component to maintain a target roll angle of the vehicle; and outputting an active roll control signal indicative of the adjusted target active roll moment component to the active roll control system to control the roll moment of the vehicle.

12. The method of claim 11, comprising determining that a change of the current spring stiffness mode indicative of the non-active roll moment component of the vehicle occurs by one or more of:

monitoring the current spring stiffness mode; and receiving a signal indicative of the change of the current spring stiffness mode.

13. Computer software which, when executed by a processor of a control system, is arranged to cause the processor perform the method according to claim 11.

14. A non-transitory, computer-readable storage medium storing instructions thereon that, when executed by one or more electronic processors of a control system, cause the one or more electronic processors to carry out the method according to claim 11.

* * * * *